United States Patent [19]
Rossi

[11] Patent Number: 4,811,820
[45] Date of Patent: Mar. 14, 1989

[54] DISK BRAKE MOTOR

[75] Inventor: Hannu Rossi, Iittala, Finland

[73] Assignee: Kone Oy, Hyvinkaa, Finland

[21] Appl. No.: 98,796

[22] Filed: Sep. 21, 1987

[30] Foreign Application Priority Data

Jan. 12, 1986 [FI] Finland ................................ 864896

[51] Int. Cl.⁴ .......................................... F16D 55/02
[52] U.S. Cl. ................. 188/71.6; 188/72.1; 188/161; 188/264 A; 310/58; 310/62; 310/76; 310/77; 310/89; 310/92
[58] Field of Search ........ 310/77, 62, 76, 63, 310/92, 57, 93, 89, 78, 58; 188/264 R, 264 A, 71.6, 72.1, 161

[56] References Cited

U.S. PATENT DOCUMENTS

| | | | |
|---|---|---|---|
| 2,208,525 | 7/1940 | Eksergian | 188/264 A |
| 2,733,361 | 1/1956 | Bessiere | 310/93 |
| 3,610,975 | 10/1971 | Onjanow | 310/63 |
| 3,674,122 | 7/1972 | Buisker | 188/264 A |
| 4,470,485 | 9/1984 | Warwick | 188/264 A |
| 4,530,680 | 7/1985 | Miranti, Jr. | 188/264 A |

FOREIGN PATENT DOCUMENTS

| | | | |
|---|---|---|---|
| 0687645 | 1/1940 | Fed. Rep. of Germany | 310/76 |
| 0746922 | 8/1944 | Fed. Rep. of Germany | 310/76 |
| 0580879 | 10/1976 | Switzerland | 310/76 |
| 0239862 | 4/1926 | United Kingdom | 188/264 |
| 0720927 | 12/1954 | United Kingdom | 310/76 |

*Primary Examiner*—R. Skudy
*Attorney, Agent, or Firm*—Birch, Stewart, Kolasch, & Birch

[57] ABSTRACT

A disk brake motor comprises an electric motor having a housing, an electromagnet, at least one friction surface and a brake wheel which is in contact with the friction surface during braking, the brake wheel including an impeller for drawing in and impelling air so that the air flows tangentially of a surface of the electromagnet into the brake wheel and past the friction surface onto a surface of the housing of the electric motor.

5 Claims, 3 Drawing Sheets

DISK BRAKE MOTOR

FIELD OF THE INVENTION

The present invention relates to a disk brake motor comprising an electric motor, an electromagnet, at least one friction surface and a brake wheel which is in contact with the friction surface during braking.

DESCRIPTION OF THE PRIOR ART

In combinations of this kind in which an electric motor is provided with an electromagnetic disk brake, the electric motor, the disk brake and the electromagnetic coil of the disk brake heat up during use, and therefore they need to be cooled. Such cooling has previously been effected by separate blowers, by means of which it has been possible to cool only the disk brake superficially.

BRIEF SUMMARY OF THE INVENTION

It is accordingly an object of the present invention to provide a considerably more efficient and simpler disk brake motor of a novel and improved type.

The present invention provides a disk brake motor comprising an electric motor, the electric motor having a housing, an electromagnet, means defining at least one friction surface and a brake wheel which is in contact with the friction surface during braking, the brake wheel including means for drawing in and impelling air so that the air flows tangentially of a surface of the electromagnet into the brake wheel and past the friction surface onto a surface of the housing of the electric motor.

This provides the advantages of efficient cooling of heat-generating components, of efficient removal of abrasion residue along with the impelled air and also of a simple design, involving few components.

The brake wheel comprises two flanges braced against each other by e.g. two partitions, the flanges and partitions constituting a centrifugal impeller, and the partitions extending in a substantially radial direction. Therefore, the cooling air can be made to pass as efficiently as possible specifically through the parts to be cooled, whereby the efficiency of the cooling process is considerably increased.

One of the flanges of the brake wheel is provided with a large opening, or several small openings, for the air to enter, and the disk brake is surrounded by an air-guiding housing, which in part extends over the electric motor.

Thus, the cooling air entering directly is efficiently introduced in the centrifugal impeller, whence guided by the air-guiding housing, it passes in between cooling fins of the electric motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further objects, features and advantages of the present invention will appear from the following description thereof when taken in conjunction with the accompanying drawings which are given by way of illustration only, and thus are not limitative of the present invention, and in which.

DESCRIPTION OF THE PREFERRED EMBODIMENT

Figure 1:
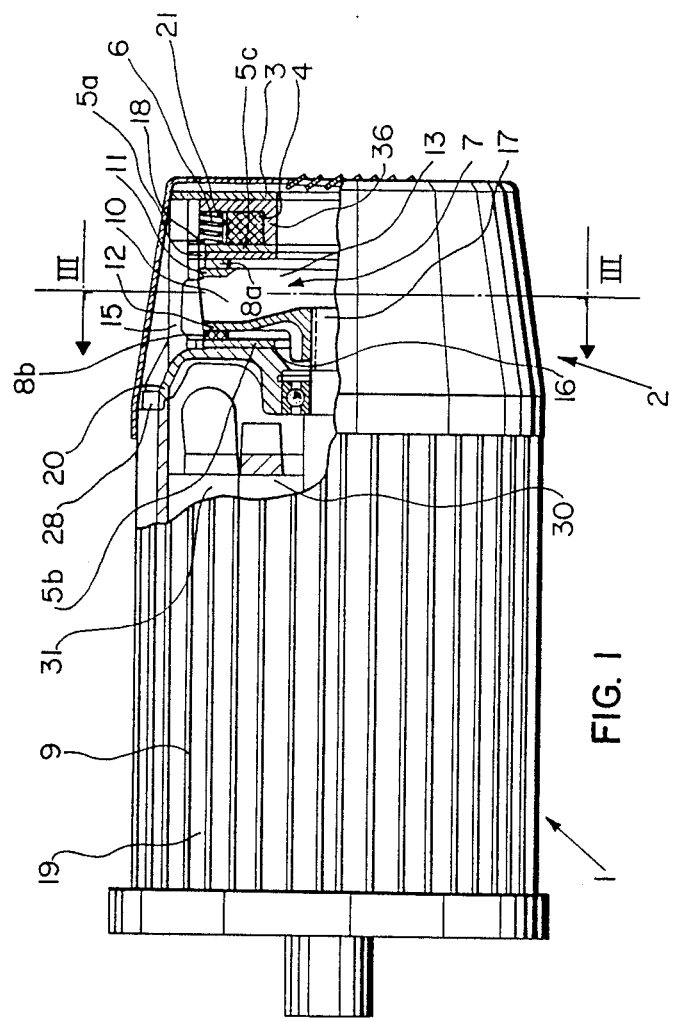
FIG. 1 shows a disk brake motor according to the present invention in elevational view and partly in section.
Figure 2:
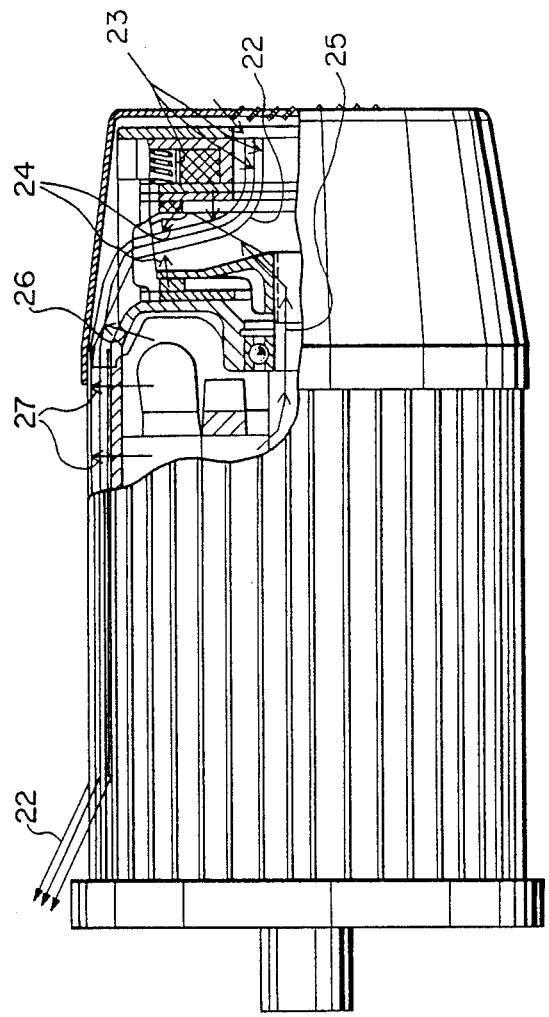
FIG. 2 shows the disk brake motor of FIG. 1 in elevational view and partly in section, with air flow arrows and thermal flow markings included.
Figure 3:
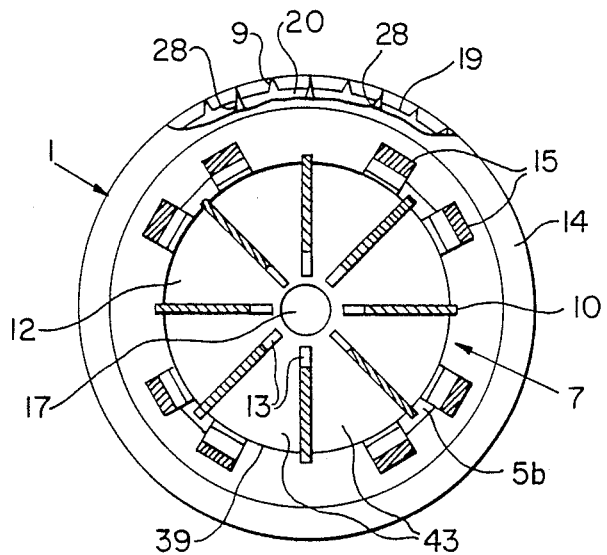
FIG. 3 shows the disk brake motor of FIG. 1, viewed from its disk brake end and in section along line III—III of FIG. 1.

With reference to FIGS. 1 and 3, a disk brake motor comprises generally a rotor 30 including a shaft 17, a stator 31 and adjacent one end thereof, a disk brake assembly 2. A motor shield 20, including lugs 15 extending axially towards disk brake assembly 2, surrounds stator 31 and in turn is surrounded by and is annularly separated from a stator housing or frame 19 by a plurality of radially spaced cooling fins 28. Stator housing 19 comprises a plurality of cooling fins 9 through which cooling air passing between shield 20 and frame 19 may escape to assist fins 28 in dissipating heat.

Disk brake assembly 2 comprises generally one but more typically two opposed friction surfaces or plates 8a and 8b which act against opposite sides of a brake wheel 7 during braking to provide a braking force or torque. Wheel 7 is connected to shaft 17 to rotate therewith and will be described in greater detail below. Friction plates 8a and 8b are attached to and held in place by means of frames 5a and 5b, respectively, the frames slidably fitting within the framework provided by lugs 15 and being held in place against rotation by means of indentations or recesses (not shown) formed in the outer edges of plates 8a and 8b to securely engage lugs 15. Although frame 5a is held against rotation, it may nevertheless move axially relative to lugs 15 and shaft 17 depending upon whether the disk brake is being applied or released. Frame 5b abuts against end surface 16 or shield 20 to limit its innermost position to the left of wheel 7 as shown in FIG. 1. Obviously, frames 5a and 5b encircle shaft 17 and include central apertures (not shown) through which the shaft passes without contact.

Frames 5a and 5b and friction plates 8a and 8b attached thereto are normally urged into contact with opposite lateral surfaces of wheel 7 by means of springs 6 (one shown) to induce a braking torque against shaft 17, whereas when the brake is to be released, an electromagnet 4 is energized to attract frame 5a and friction plate 8a away from braking contact with wheel 7, the electromagnet being sufficiently strong to overcome the bias of spring 6. In the embodiment shown in FIG. 1, electromagnet 4 is formed having cavities or recesses 21 in which springs 6 are received. The spring/electromagnet combination is retained within a magnet housing 36 disposed axially within lugs 15 by means of, for example, threaded fasteners. Springs 6 are maintained in recesses 21 in a compressed condition, acting at one end against housing 36 and at the other end against an armature plate 5a that abuts against frame 5a and is axially movable therewith relative to lugs 15 and shaft 17. Plate 5a is separated from spring 6 by means of a thin, nonmagnetic ring 18 which, along its outer edge, has no lugs or recesses and is of a diameter to be mounted against the adjacent surface of plate 5c with ease.

The outer diameter of the ring 18 is slightly less than the inner diameter defined by lugs 15 of shield 20, ring 18 having an inner radius smaller than its outer radius by at least the diameter of springs 6. Most advantageously, the difference between the outer radius of ring 18 and its inner radius is slightly larger than the diameter of springs 6.

The frames 5a and 5b of the friction plate have similar outer circumferences and a small spring force therebetween exerts its influence by pushing them outwardly from one another.

Frame 5a is provided with a large opening, or several small openings (neither shown) cooling air to flow therethrough as will be described in greater detail below. Plate 5c, the electromagnet 4, back plate 3 and housing 3 each have in their central part a large opening or several small openings (neither shown) of any suitable shape allowing for cooling air to flow therethrough. An air-guiding sheathing 14 is attached outside the lugs 15 of the motor shield 20 to guide the air current generated by the brake wheel 7 in a manner to be described below between the fins 9 on the housing 19 of the motor.

In the embodiment shown in FIGS. 1 and 3, brake wheel 7 comprises a pair of axially spaced apart circular disks or flanges 11 and 12 interconnected and braced by means of a plurality of partitions 10. As seen most clearly in FIG. 3, partitions 10 are radially deployed to terminate adjacent the peripheral edge 39 of wheel 7 to define, in cooperation with flanges 11 and 12, a series of outwardly opening apertures 43. Flange 11 includes in a mid-section thereof a large or several small openings 13 (FIG. 3) through which air is drawn as wheel 7 rotates with shaft 17, this air being expelled by action of the rotation of wheel 7 through apertures 43 with partitions 10 acting as vanes. Thus, wheel 7 serves not only to transmit braking torque to shaft 17, but also as a centrifugal impeller for drawing in and expelling air outwardly to cool the electromagnet, the brake and the motor as will now be described.

When the motor is rotating, the brake wheel 7 rotates together with the shaft 17, whereby the brake wheel, owing to its design, generates an air current 22 which passes around or through the openings in backing plate 3, magnet housing 36, the electromagnet 4, the armature plate 5c and the frame 5a, and through the air holes in the middle section of the flange 11 of the brake wheel into the brake wheel 7, where it passes between the partitions 10 and the flanges 11 and 12 and travels past the lugs 15 of the motor shield 20, guided by sheathing 14, between the cooling fins 28 and fins 9 of the stator frame 19. In the disk brake motor, the heat energy sources which require cooling comprise, primarily, the electric motor, the friction surfaces which heat up during braking and the electromagnet. Most of the thermal energy from the electromagnet 4, whih is indicated by reference numeral 23, passes into the cooling air current contacting the surface of the electromagnet. Similarly, most of the braking energy of the friction plates 8a and 8b goes in the form of heat, indicated by reference numeral 24, through the thin flanges 11 and 12 into the cooling air flowing past. From the motor 1 the heat goes in part as rotor waste heat, indicated by reference numeral 25, through the shaft 17 and the hub of the brake wheel 7, and through the flange 12, to the cooling air and, in its main parts indicated by reference numerals 26 and 27, through the motor shield 20 and the stator frame 19 to the cooling air flowing past. Owing to the blowing effect of the present design, any abrasion residues from the braking surfaces escape along with the powerful air flow.

It will be obvious to those persons skilled in the art that the invention is not restricted to the example presented in the foregoing and that it may vary within the scope of the claims present below. For instance, the brake of the invention may serve as a safety brake, in which case the bias force producing the braking torque is on all the time, caused for instance by spring force, gravity or a permanent magnet, and the electromagnet is used to release the brake by cancelling the bias force. The bias force of the brake may also be produced by means of an electromagnet, in which case regulation of the bias force is a simple matter and the brake may be employed in various controlled drives, e.g. for maintaining a constant speed of rotation, for producing any desired acceleration or deceleration, etc. In continuous controlled drive use, the cooling of the brake magnet allows the magnet to be made with smaller dimensions, in addition to which the friction surface is cooled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A disk brake motor comprising:
an electric motor having a rotatable shaft extending axially therethrough;
a housing about said motor;
means defining at least one friction surface;
a brake wheel on said shaft for rotation therewith, said brake wheel being in contact with said friction surface during braking; and
an electromagnet actuatable to control said contact between said at least one friction surface and said brake wheel;
said brake wheel including means for drawing in and impelling air so that the air flows around and through said electromagnet, into and then through said brake wheel, past said friction surface and onto a surface of said housing, said brake wheel including a pair of axially spaced flanges, at least one of which has at least one opening therein for drawing in air, and partition means disposed therebetween and cooperating with said flanges to form a centrifugal impeller.

2. The disk brake motor of claim 1 wherein said partition means is axially disposed between said flanges and extend radially thereof to define at the peripheral edge of said wheel, in cooperation with said flanges, a plurality of outwardly opening apertures for expelling said air.

3. The disk brake motor of claim 2 further comprising a pair of said friction surfaces for contacting opposite sides of said brake wheel during braking, wherein said air passes between said pair of friction surfaces.

4. The disk brake motor of claim 3 wherein said electromagnet and said electric motor are disposed at opposite ends of said shaft with said brake wheel disposed therebetween.

5. The disk brake motor of claim 4, further comprising a sheathing extending around said electromagnet and said brake wheel and a portion of said electric motor to guide said air onto said surface of said housing.

* * * * *